United States Patent [19]

Skubal

[11] 4,108,423

[45] Aug. 22, 1978

[54] GAS SPRING

[75] Inventor: John J. Skubal, Rockford, Ill.

[73] Assignee: Atwood Vacuum Machine Company, Rockford, Ill.

[21] Appl. No.: 706,903

[22] Filed: Jul. 19, 1976

[51] Int. Cl.² ............................................. F16F 5/00
[52] U.S. Cl. .................................. 267/64 R; 188/322
[58] Field of Search ........................... 267/64 R, 65 R;
188/322, 269; 308/3, 5

[56] References Cited

U.S. PATENT DOCUMENTS

| 3,207,498 | 9/1965 | Wustenhagen et al. | 267/65 R |
|---|---|---|---|
| 3,456,940 | 7/1969 | Graef | 267/64 R |
| 3,856,287 | 12/1974 | Freitag | 267/64 R |
| 3,963,227 | 6/1976 | Molders | 267/64 R |

Primary Examiner—James B. Marbert

Attorney, Agent, or Firm—Leydig, Voit, Osann, Mayer & Holt, Ltd.

[57] ABSTRACT

A gas spring for movable members such as vehicle deck lids in which a piston assembly carried on the end of a rod slides back and forth in a cylinder to expand and contract the spring. The cylinder is sealed at the head end and also around the rod and is filled with a combination of oil and a gas under pressure. The piston assembly is such that the passage of oil and gas from one side to the other is restricted as the spring is expanded by extending the rod and this produces a dampening action but the restriction is eliminated when the spring is contracted so that there is virtually no dampening effect. The sealing assembly around the rod includes sealing means, an oil reservoir disposed inwardly of the sealing means and capillary passages communicating with the reservoir. Capillary action maintains a body of oil between the sealing means and the gas in the cylinder irrespective of the angular attitude of the spring.

9 Claims, 7 Drawing Figures

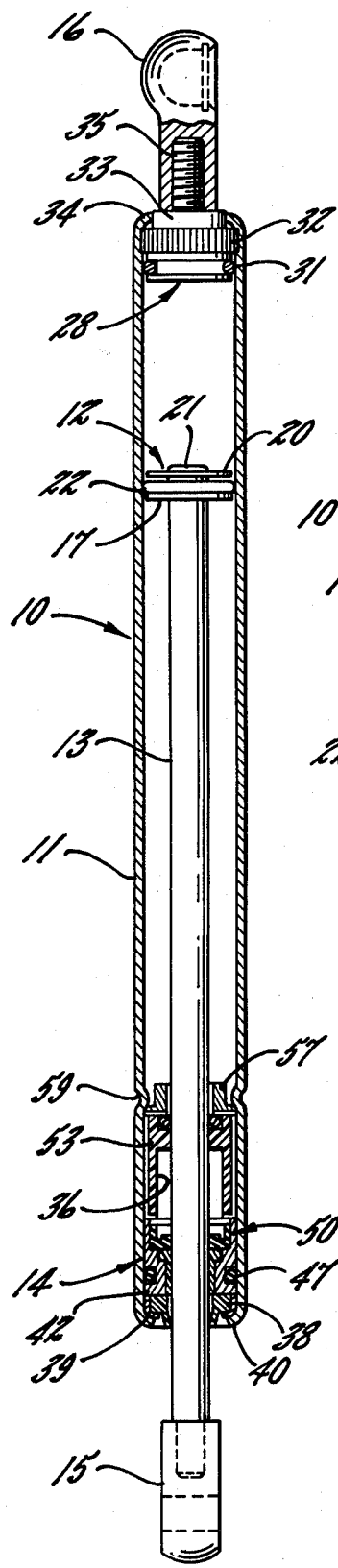
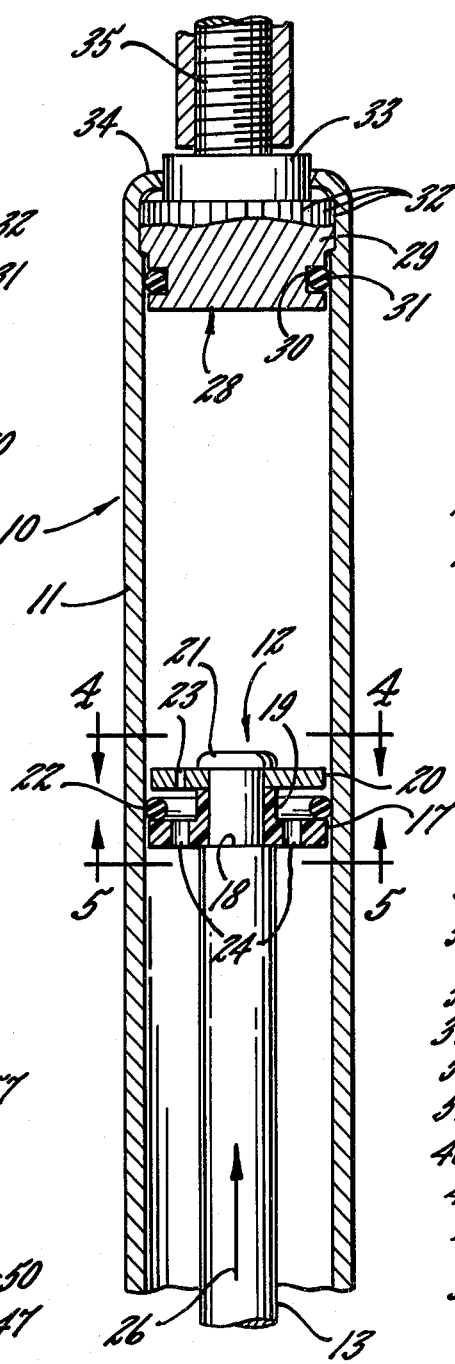
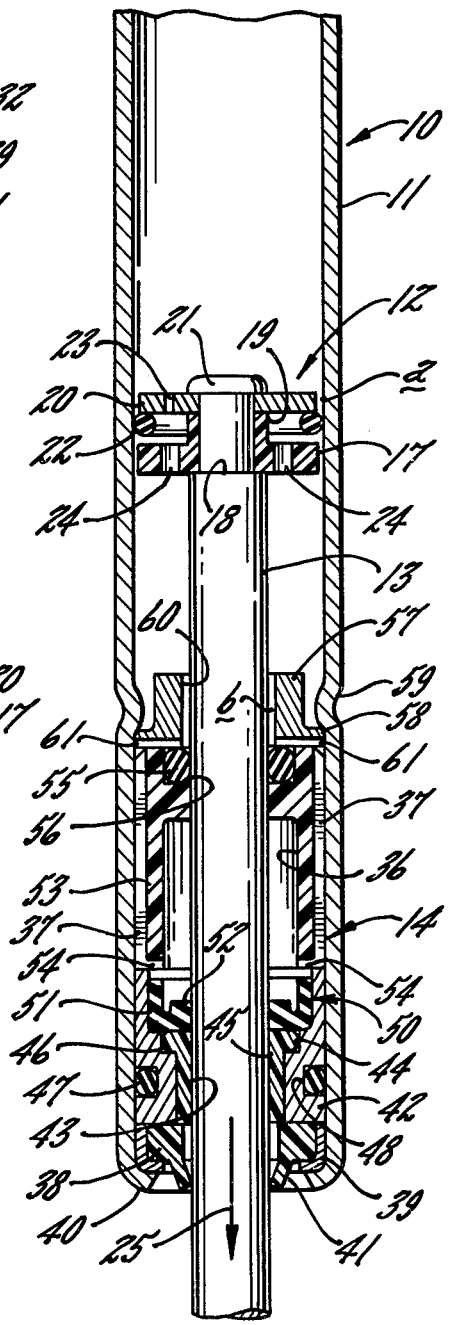
fig. 1.
fig. 2.
fig. 3.

4,108,423

GAS SPRING

BACKGROUND OF THE INVENTION

The present invention relates to a gas spring of the type in which a piston assembly carried on the end of a rod slides back and forth in a cylinder so that extending and retracting the rod expands and contracts the spring. The cylinder is sealed at the head end and sealing means also is provided between the rod and the cylinder and the cylinder is filled with a fluid under pressure. The piston assembly is such that the passage of pressure fluid from one side to the other is restricted as the spring is expanded and this results in a dampening action but the restriction is eliminated when the spring is contracted so that there is virtually no dampening effect. A gas spring of this general type is shown in Wustenhagen et al U.S. Pat. No. 3,207,498.

SUMMARY OF THE INVENTION

The general object of the invention is to provide an improved seal between the rod and the cylinder by using a combination of oil and a gas under pressure as the pressure fluid and by incorporating a novel means for insuring that a body of oil is maintained between the sealing means and the gas in the cylinder.

A more detailed object is to achieve the foregoing by forming a reservoir for oil inwardly of the sealing means and by providing capillary passages which communicate with the reservoir and which thereby maintain oil in the reservoir and thus the body of oil between the sealing means and the gas.

The invention also resides in the particular construction of the sealing means, the reservoir and the capillary passages and especially in the relationship of the parts whereby the rod is supported for virtually true axial movement thereby reducing operating friction.

Still another object is to construct the sealing assembly between the rod and the cylinder in a novel manner so that, should the pressure in the cylinder become excessive as by overheating, the excess pressure is released in a controlled manner without the cylinder rupturing.

BRIEF DESCRIPTION OF THE DRAWINGS

FIG. 1 is a longitudinal sectional view of a gas spring incorporating the present invention.

FIG. 2 is an enlarged fragmentary sectional view similar to FIG. 1 and showing the head end portion of the spring.

FIG. 3 is an enlarged fragmentary sectional view similar to FIG. 1 and showing the rod end of the spring with the parts in a moved position.

DETAILED DESCRIPTION OF THE PREFERRED EMBODIMENTS

Figure 4:
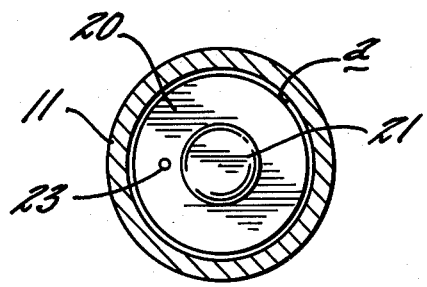
FIG. 4 is a sectional view taken along the line 4—4 in FIG. 2.

As shown in the drawings for purposes of illustration, the invention is embodied in a gas spring 10 for lifting and holding a movable member, such as a hinged vehicle deck lid (not shown), in a predetermined position. Herein, the spring includes an elongated cylinder 11 closed at its upper end and a piston assembly 12 carried on the end of a rod 13 which slidably projects into the cylinder through a seal assembly 14 disposed within the cylinder adjacent the lower end thereof. Although the spring may be inverted, it is shown herein when using the spring with a vehicle deck lid with the projecting end of the rod 13 pivotally connected to the lid by a fitting 15 on the rod and the cylinder 11 pivotally connected to the vehicle body by a fitting 16 secured to the top or closed end of the cylinder.

Figure 5:
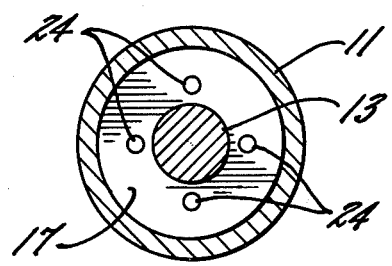
FIG. 5 is a sectional view taken along the line 5—5 in FIG. 2.

In the present instance, the piston assembly 12 includes a lower washer 17 which is made of any suitable plastic-like such as nylon and is seated on a shoulder 18 (FIGS. 2 and 3) on the rod 13 adjacent the upper end thereof. An upwardly projecting hub 19 on the washer supports a second washer 20 which herein is made of metal, the hub serving as a spacer to separate the two washers. A head 21 is upset on the upper end of the rod to hold the washers firmly in place on the rod and a rubber O-ring 22 is disposed between the washers. Preferably, the diameter of the plastic washer 17 is slightly smaller than the internal diameter of the cylinder 11 and the metal washer 20 is somewhat smaller in diameter than the plastic washer. A small orifice 23 is formed in the metal washer (see FIG. 4) and a plurality of holes 24, herein four, are formed in the plastic washer (FIG. 5) and are equally spaced around the center of the latter. For a purpose to be described later, the total area of these holes 24 is approximately equal to the area $a$ (FIG. 4) between the metal washer 20 and the cylinder 11. The cylinder is filled with a pressure fluid which herein is a combination of oil and an inert gas, such as nitrogen, under pressure. The particular proportions vary with the intended use of the spring but a ratio of one-third oil and two-thirds gas is exemplary.

With the foregoing arrangement, the hinged member or deck lid is raised by sliding the rod 13 down relative to the cylinder 11, as indicated by the arrow 25 in FIG. 3. Under these conditions, the O-ring 22 slides up relative to the rod and into engagement with the metal washer 20 thereby sealing the area $a$ between the metal washer and the cylinder. As a result, as the spring is expanded, oil and gas beneath the piston assembly 12 passes through the holes 24 in the plastic washer 17 but can reach the space above the piston assembly only by passing through the orifice 23 in the metal washer 20. This results in a dampening effect. When the rod 13 is moved in the opposite direction relative to the cylinder 11 as indicated by the arrow 26 in FIG. 2, such as when a deck lid is being closed, the O-ring 22 moves down relative to the rod. This opens the space $a$ between the metal washer 20 and the cylinder and, because the area of this space is approximately equal to the total area of the holes 24, oil and gas above the piston assembly flow comparatively freely around the metal washer and through the holes 24. Thus, there is virtually no dampening action as the spring is contracted. Although the pressures within the cylinder 11 vary according to application, typical pressures for use with a vehicle deck lid are approximately 1500 p.s.i. when the spring is contracted and 900 p.s.i. when the spring is expanded.

The upper end of the cylinder 11 is closed in such a manner as to avoid the necessity of welding. To this end, the wall of the cylinder at the upper end initially is straight and a cylindrical plug 28 is inserted into the upper end of the cylinder. The plug includes an enlarged portion 29 and, beneath the enlarged portion 29, the plug 28 is formed with a groove 30 extending completely around the plug. An O-ring 31 made of rubber or the like is inserted in the groove to form a seal between the plug and the cylinder 11. Comparatively sharp, axially extending teeth 32 are formed on the surface of the enlarged portion 29 and cut or bite into the inner wall of the cylinder 11 as the plug is inserted. Thus, the teeth coact with the inner wall to form a rigid and non-rotatable connection between the plug and the cylinder. A cylindrical boss 33 of reduced diameter is disposed above the enlarged portion and formed as an integral part of the plug 28. With the plug 28 and the O-ring 31 in place in the upper end of the cylinder 11, the extreme upper end portion 34 is turned inward over the top of the enlarged portion 29 of the plug and around the boss 33 as illustrated in FIGS. 1 and 2, thus holding the parts in place. Coaxial with and as an integral part of the plug 28 is a threaded pin 35 upstanding from the boss 33. As shown in FIG. 1, the pin receives the fitting 16 which in this instance is a socket.

Based upon the recognition that an oil-tight seal is easier to maintain as compared to a gas-tight seal, the present invention contemplates a novel seal assembly 14 between the rod 13 and the cylinder 11 which assembly insures that a body of oil is maintained between the sealing means or elements of the assembly 14 and the gas in the cylinder 11 regardless of the angular attitude of the spring 10. In general, this is achieved by providing a reservoir 36 for oil disposed interiorly of the sealing elements and communicating with a plurality of capillary passages, herein grooves 37, which also are interior of the sealing elements and which extend generally axially or longitudinally along the inner wall of the cylinder 11. The passages communicate with the reservoir and contain oil to insure that there is oil in the reservoir and thus that there is oil between the sealing elements and the gas. The invention further resides in the selection of materials for the sealing assembly 14 so that, should the pressure within the cylinder 11 become excessive such as by overheating, the sealing assembly safely releases the oil and gas in a controlled manner without the cylinder rupturing.

In the present instance, the sealing assembly 14 includes an annular wiper 38 supported in a circular metal retainer 39 which, as shown most clearly in FIG. 3, is seated on the inturned bottom end portion 40 of the cylinder 11. The wiper is made of a material such as polyurethane and includes a flexible flange 41 projecting downwardly and inwardly to encircle and bear against the rod 13 whereby the flange wipes the rod as the latter slides into and out of the cylinder. Resting on the retainer 39 is a metal cylinder 42 with a bore 43 enlarged at its upper end as indicated at 44 and a bearing sleeve 45 of a plastic material such as nylon is disposed within the bore 43 to encircle the rod 13 and is formed with a flange 46 received in the enlargement 44 of the bore 43. An O-ring 47 of rubber or the like is disposed in an annular groove 48 in the metal cylinder 42 and provides a seal between the latter and the main cylinder 11. Projecting upwardly from the cylinder 42 around the periphery thereof is a flange 49 which forms a cup to receive a circular sealing member or disk 50 made of an elastomer such as nitrile rubber, the retainer 39 and the cylinder 42 constituting a supporting means for the disk 50. A flange 51 upstanding from the periphery of the disk 50 bears against the flange 49 and a boss 52 on the center of the disk fits snugly around the rod 13 to form a seal between the rod and the metal cylinder 42.

It will be observed, therefore, that the O-ring 47 and the disk 50 together with the cylinder 42 form the sealing means between the rod and the cylinder 11.

Figure 6:
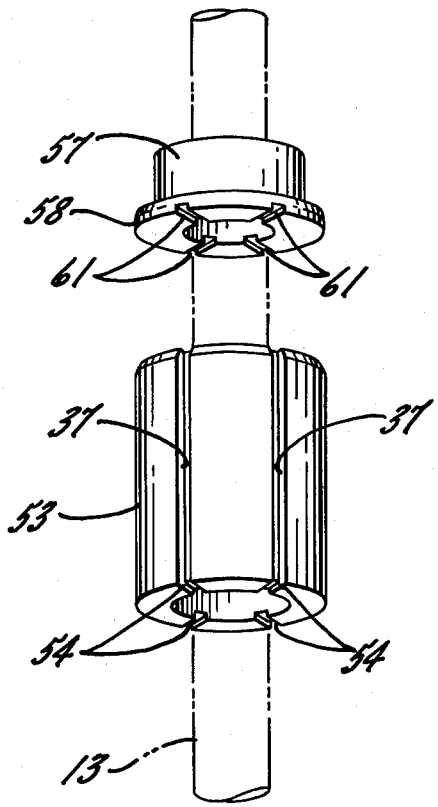
FIG. 6 is an exploded perspective view of the parts which form the reservoir and the capillary grooves.

To provide the reservoir 36 and the capillary grooves 37, a cylindrical member 53 made of a plastic such as nylon rests on the metal cylinder 42 and is sized to fit snugly within the cylinder 11. The interior of the member 53 is hollow to provide a downwardly opening cavity which constitutes the reservoir 36. As shown in FIG. 6, four capillary grooves are used and they are equally spaced around the member 53 and are parallel to the axis of the cylinder 11. At their lower ends, the grooves 37 intersect radial grooves 54 in the bottom of the member 53 so that the capillary grooves 37 communicate with the reservoir. An O-ring 55 of rubber or the like is seated in an upwardly opening circular groove 56 in the member 53 and encircles the rod 13 to provide a seal between the member and the rod and maintain the oil in the reservoir.

On top of the cylindrical member 53 is a retainer ring 57 which encircles the rod 13 and has a diameter smaller than the internal diameter of the cylinder 11. A radial flange 58 projects outwardly from the lower end of the ring 57 toward the inner wall of the cylinder and the latter is crimped as indicated at 59 so that the flange bears on the inner wall of the cylinder to hold the various parts of the seal assembly 14 in position. The bore 60 of the ring 57 is larger in diameter than the rod 11 thus leaving an annular space $b$ between the two and four radial grooves 61 (see FIG. 6) are formed in the underside of the retainer 57 to connect the space $b$ with the capillary grooves 37.

As stated above, the cylinder 11 is filled with a combination of oil and a gas under pressure. The oil is inserted in the cylinder first with the interior of the cylinder being at atmospheric pressure. The oil flows into the various spaces within the sealing assembly 14 including the reservoir 36 and the capillary grooves 37 and also generally covers the sealing assembly. The gas in the cylinder then is pressurized but there is virtually no gas in the sealing assembly. Accordingly, the capillary attraction of the oil in the grooves 37 maintains a supply of oil to replenish oil lost from the reservoir not only when the gas spring is being expanded or contracted but also when the spring is in a static or inoperative condition and, further, this body of oil is maintained irrespective of the angular attitude of the spring 10. Moreover, by using plastic or plastic-like materials for parts of the sealing assembly 14 and particularly for the cylindrical member 53, the seal disk 50 and the bearing sleeve 45, these parts have a proportionally greater loss in tensile strength as compared to the cylinder as the temperature increases. Accordingly, should the pressure within the cylinder become excessive as by overheating, the excess pressure is safely released around the rod 11 and out through the lower end of the cylinder without the cylinder rupturing and the pressure is released at a predictable level and in a controlled manner. Another important aspect of the present sealing assembly is that the inner seal or disk 50 is located roughly midway between the ends of the assembly. As a result, the rod 13 is supported for virtually true axial movement particularly relative to the cylinder 42 and the member 53 and this maximizes the ability of the seal to remain in contact with the rod when the rod is subjected to opposing eccentric displacement forces on the rod as would be caused by side loading.

Figure 7:
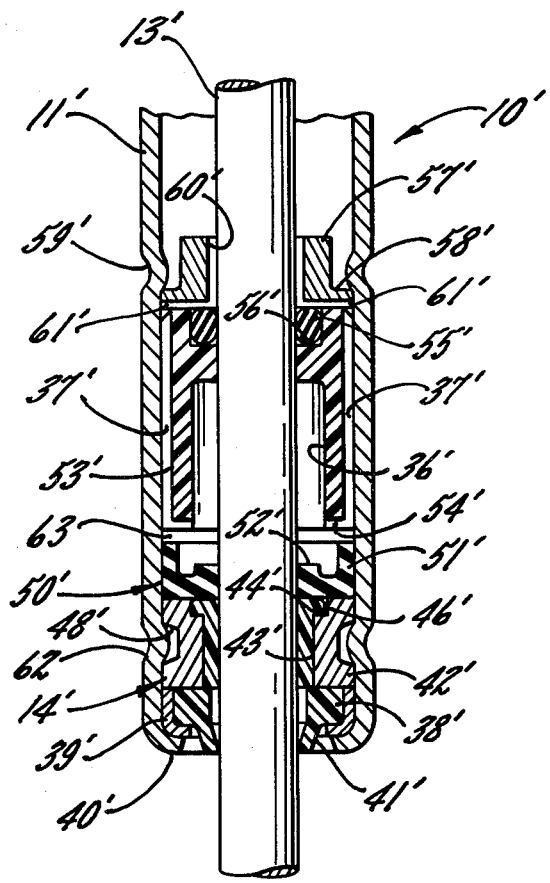
FIG. 7 is a view similar to FIG. 3 but showing a modified sealing assembly.

A modified form of the sealing assembly 14' is illustrated in FIG. 7 in which similar parts are indicated by the same but primed reference characters. In this form, the O-ring 47 is eliminated, although the groove 48' in the metal cylinder 42' may be retained with the cylinder 11' crimped into this groove as indicated at 62, and the seal disk 50' seals both around the rod 13' and around the inner wall of the cylinder 11'. Thus, the flange 49 on the member 42' is eliminated and the disk 50' is sized to fit snugly within the cylinder 11' so that the peripheral flange 51' on the disk forms a seal between the flange and the inside of the cylinder. As with the disk 50, the disk 50' is formed with a central boss 52' which seals around the rod 13'. The length of the cylindrical member 42' and the position of the crimp 59' over the flange 58' of the retainer 57' is such as to leave a gap 63 between the lower end of the cylindrical member and the upper surface of the flange 51' on the disk 50'. The gap 63 reduces undesirable mechanical forces being applied to the seal. As in the first form, the capillary attraction of oil into the grooves 37' maintains oil in the reservoir 36' and hence a body of oil between the seal disk 50' and the gas in the cylinder 11'. The modified sealing assembly 14' also results in a controlled release of excessive pressure such as may be caused by overheating.

I claim:

1. In a gas spring having a cylinder closed at a first end, a rod slidably projecting into the cylinder through the second end thereof and carrying a piston assembly, and oil and gas under pressure within the cylinder, the combination of, means disposed within said cylinder adjacent said second end and supporting said rod for axial sliding, sealing means disposed within said cylinder adjacent said second end and forming a seal around said rod and between the rod and the cylinder, and a cylindrical member disposed within said cylinder inwardly of said sealing means and fitting snugly within the cylinder, said cylindrical member having an internal cavity forming a reservoir and a capillary passage formed in said member, said passage communicating with said reservoir and with the interior of said cylinder, a portion of the oil in said cylinder being in said reservoir and a portion of the oil being held in said passage by capillary attraction whereby the reservoir is replenished with oil from said passage thereby to maintain a body of oil between said sealing means and the gas in the cylinder.

2. A gas spring as defined in claim 1 in which said capillary passage comprises a plurality of capillary grooves formed in said cylindrical member.

3. A gas spring as defined in claim 2 in which said capillary grooves extend generally axially and are formed in the outer surface of said cylindrical member.

4. In a gas spring having a cylinder closed at a first end, a rod slidably projecting into the cylinder through the second end thereof and carrying a piston assembly, and oil and gas under pressure within the cylinder, the combination of, means disposed within said cylinder adjacent said second end and supporting said rod for axial sliding, sealing means disposed within said cylinder adjacent said second end and forming a seal around said rod and between the rod and the cylinder, a cylindrical member disposed within said cylinder inwardly of said sealing means and fitting snugly within the cylinder, said cylindrical member having an internal cavity forming a reservoir and a capillary passage formed in said member, said passage communicating with said reservoir and with the interior of said cylinder, a portion of the oil in said cylinder being in said reservoir and a portion of the oil being held in said passage by capillary attraction whereby the reservoir is replenished with oil from said passage thereby to maintain a body of oil between said sealing means and the gas in the cylinder, and an annular supporting means encircling said rod and disposed within said cylinder between said sealing means and said second end whereby the sealing means is near midway of the assembly comprising said cylindrical member, said sealing means and said supporting means, said supporting means abutting a portion of said cylinder adjacent said second end.

5. A gas spring as defined in claim 4 in which the materials of said sealing means and at least a portion of said supporting means have a proportionally greater loss in tensile strength, as compared with the material of the cylinder, upon an increase in temperature whereby excessive pressure caused by overheating is safely released around said rod and through said second end.

6. In a gas spring having a cylinder closed at a first end, a rod slidably projecting into the cylinder through the second end thereof and carrying a piston assembly, and oil and gas under pressure in the cylinder, the combination of, an annulus disposed within said cylinder adjacent said second end and fitting snugly within the cylinder, an annular bearing member supported within said annulus and surrounding said rod to support the latter for axial sliding, said annulus having a groove around its exterior and a circular recess in its inner end, an O-ring of resilient material disposed within said groove and forming a seal between said annulus and said cylinder, a circular seal of resilient material disposed in said recess and surrounding said rod to form a seal between said annulus and the rod, a cylindrical member disposed within said cylinder inwardly of said annulus and said seal and fitting snugly within the cylinder, said cylindrical member having an internal cavity forming a reservoir and having a capillary passage communicating with said reservoir and with the interior of said cylinder, a portion of the oil in said cylinder being in said reservoir and a portion of the oil being held in said passage by capillary attraction whereby the reservoir is replenished with oil from said passage thereby to separate said O-ring and said seal from the gas in said cylinder with a body of oil, and means holding said annulus and said cylindrical member in a fixed axial position relative to said cylinder.

7. A gas spring as defined in claim 6 in said capillary passage comprises a plurality of capillary grooves formed in the outer surface of said cylindrical member and extending generally axially thereof.

8. In a gas spring having a cylinder closed at a first end, a rod slidably projecting into the cylinder through the second end thereof and carrying a piston assembly, and oil and gas under pressure in the cylinder, the combination of, an annulus disposed within said cylinder adjacent said second end and fitting snugly within the cylinder, an annular bearing member supported within said annulus and surrounding said rod to support the latter for axial sliding, a circular seal of resilient material disposed on the inner end of said annulus and surrounding said rod to form a seal between said cylinder and the rod, a cylindrical member disposed within said cylinder inwardy of said annulus and said seal and fitting snugly within the cylinder, said cylindrical member having an internal cavity forming a reservoir and having a capillary passage communicating with said reservoir and with the interior of said cylinder, a portion of the oil in said cylinder being in said reservoir and a portion of the oil being held in said passage by capillary attraction whereby the reservoir is replenished with oil from said passage thereby to separate said seal from the gas in said cylinder with a body of oil, and means holding said annulus and said cylindrical member in a fixed axial position relative to said cylinder.

9. A gas spring as defined in claim 8 in said capillary passage comprises a plurality of capillary grooves formed in the outer surface of said cylindrical member and extending generally axially thereof.

* * * * *